April 7, 1925.
F. BALCH
FLUORESCENT SCREEN
Filed Jan. 10, 1923
1,532,796
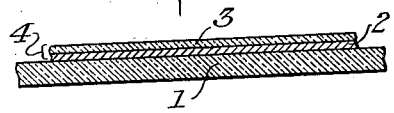
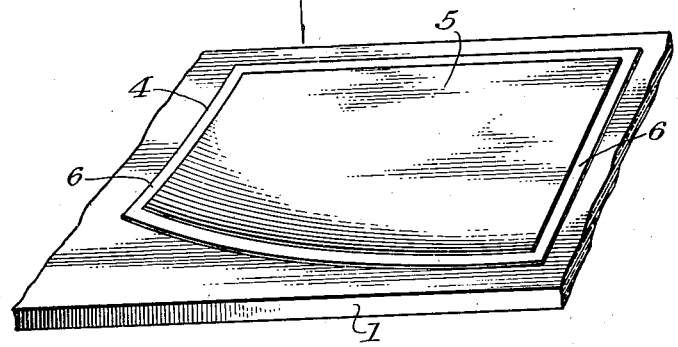
INVENTOR
Frank Balch,
BY ATTORNEYS.

Patented Apr. 7, 1925.

1,532,796

UNITED STATES PATENT OFFICE.

FRANK BALCH, OF SALEM, MASSACHUSETTS.

FLUORESCENT SCREEN.

Application filed January 10, 1923. Serial No. 611,872.

*To all whom it may concern:*

Be it known that I, FRANK BALCH, a citizen of the United States of America, residing at Salem, in the county of Essex and State of Massachusetts, have invented certain new and useful Improvements in Fluorescent Screens, of which the following is a full, clear, and exact specification.

This invention relates to fluorescent screens used to intensify the image produced on a sensitive plate or film by X-rays. The active layer of a fluorescent screen generally consists of fine particles of fluorescent material, usually a salt in crystalline form held in suspension in a binding material. I have found that this binding material can comprise cellulose acetate as its principal ingredient, and that a screen can be made of high intensifying value which is not fragile, which is noticeably free from mechanical imperfections and which may be made by simple and reliable methods of manufacture.

Reference will now be made to the accompanying drawing in which the same reference characters designate the same parts throughout:

Fig. 1 is an enlarged fragmentary section of the film screen on the supporting table;

Fig. 2 is a perspective view of a complete screen being stripped from the table.

In manufacturing the preferred form of my improved screen I form an emulsion or mixture of cellulose acetate and a suitable binder.

A solution is first made in accordance with the following formula:

| | |
|---|---|
| Acetylene tetrachloride | 4000 cc. |
| Methyl alcohol | 600 cc. |
| Castor oil, cold pressed | 100 cc. |
| Canada balsam, pale yellow | 100 cc. |
| Urea crystals | 55 grams. |

When this is thoroughly mixed and the crystals dissolved there is added thereto, cellulose acetate, dry, 680 grams. When fully dissolved, this is strained. This solution will be hereinafter referred to as solution A. If it is necessary or desirable to thin it the following thinning solution may be used: acetylene tetrachloride 1000 cc., methyl alcohol 125 cc.

I then prepare the following mixture:

*Mixture B.*

| | |
|---|---|
| Calcium tungstate | 4550 grams. |
| Acetylene tetrachloride | 500 cc. |
| Methyl alcohol | 15 cc. |
| Castor oil | 45 cc. |
| Canada balsam | 15 cc. |

This is ground in a pebble mill to a very fine mass and strained. All of the constituents of both formulæ are preferably of a high degree of purity. I then mix the total amount of mixture B given in the formula with about 1800 cc. of solution A and remove all air bells by means of proper suction with an air pump. This is poured at room temperature over a polished glass table 1 and forms a layer 2 which dries slowly by the partial evaporation of the solvents, forming a smooth film which, while coherent, is rather fragile for constant or rough usage. I form a backing or supporting layer 3 by pouring over this film while still somewhat tacky a coating of solution A, the amount depending on the thickness of the desired support 3.

It is sometimes desirable to attach to a film screen 4, made as described, a further back or support, and I use preferably a piece of cardboard 5 glued to the film screen 4 just described. This may be attached before or after stripping the film screen from the glass plate 1, but I prefer to do so before stripping. Pieces of cardboard are cut to the desired dimensions and the screen material on the glass plate is cut to sizes slightly larger than the pieces of cardboard. A piece of cardboard 5 is then glued to the corresponding film screen section, being located so as to leave a narrow margin 6 of the film screen around the cardboard. I find that the glue adheres to the cellulosic support much more firmly if the latter is, when dry, first evenly coated with a thin even film of bleached shellac dissolved in alcohol. A very wide range of equivalents is possible in the adhesive composition used, and the following is given as a typical satisfactory formula:

| Liquid fish glue | 320 cc. |
|---|---|
| Thick syrup of sugar | 160 cc. |
| Glycerin | 10 cc. |

When the glue is set, the complete screen is stripped from the support by reason of the margin 6 of highly flexible cellulosic material. It is possible to start the stripping readily and the cardboard is sufficiently flexible to permit easy stripping after the process is thus started.

It is thus possible to make a screen having a low proportion of cellulose acetate to calcium tungstate, the proportion used being dependent largely upon the reliance placed upon the additional supporting layers for ruggedness. In the formula given by way of example this proportion is about 5% but I do not limit myself to that figure, but if too great a percentage, which I place at 8 per cent, be used, the efficiency of the screen becomes noticeably less. In a finished screen cellulose acetate appears to be more transparent to fluorescent rays than some other binding materials and affords other manufacturing advantages.

I have found that satisfactory results are obtained if the film containing the fluorescent salt has a thickness of about .015" and the second or supporting film has a thickness of about .035". I do not, however, limit myself to these dimensions which are given only by way of example. The thickness of the cardboard is quite immaterial.

While I have herein fully described the preferred embodiment, it is to be understood that I contemplate as within my invention such modifications and equivalents as fall within the terms of the appended claims.

Having thus described my invention, what I claim as new and desire to secure by Letters Patent is:

1. A fluorescent screen having an active layer comprising a mixture of fluorescent material and a binder, the binder comprising cellulose acetate.

2. A fluorescent screen having an active layer comprising a mixture of fluorescent material and a binder, the binder comprising cellulose acetate and acetylene tetrachloride.

3. A fluorescent screen having an active layer comprising a mixture of fluorescent material and a binder, the binder comprising cellulose acetate, and the proportion of the cellulose acetate to the fluorescent material being not over eight per cent by weight.

4. A fluorescent screen having an active layer comprising a mixture of fluorescent material and a binder containing cellulose acetate and a second layer adherent thereto and comprising a cellulose ester.

5. A fluorescent screen having an active layer comprising a mixture of fluorescent material and a binder containing cellulose acetate and acetylene tetrachloride, and a supporting, backing layer adherent thereto and thicker and stronger than said active layer.

6. A fluorescent screen having an active layer comprising a mixture of fluorescent material and a binder containing cellulose acetate, the proportion of the cellulose acetate to the fluorescent material being not over eight per cent by weight and a supporting, backing layer adherent thereto and thicker and stronger than said active layer, and comprising a cellulose ester.

7. A fluorescent screen having an active layer comprising a mixture of fluorescent material and a binder containing cellulose acetate, and acetylene tetrachloride, the proportion of the cellulose acetate to the fluorescent material being not over eight per cent by weight and a supporting, backing layer adherent thereto and thicker and stronger than said active layer, and comprising cellulose acetate.

Signed at Salem, Massachusetts this 5th day of January 1923.

FRANK BALCH.